(12) United States Patent
Davis et al.

(10) Patent No.: US 10,619,743 B2
(45) Date of Patent: Apr. 14, 2020

(54) SPLINED HONEYCOMB SEALS

(71) Applicant: United Technologies Corporation, Hartford, CT (US)

(72) Inventors: Timothy M. Davis, Kennebunk, ME (US); Jeffrey Vincent Anastas, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 403 days.

(21) Appl. No.: 15/022,838

(22) PCT Filed: Jul. 30, 2014

(86) PCT No.: PCT/US2014/048846
§ 371 (c)(1),
(2) Date: Mar. 17, 2016

(87) PCT Pub. No.: WO2015/041753
PCT Pub. Date: Mar. 26, 2015

(65) Prior Publication Data
US 2016/0208926 A1 Jul. 21, 2016

Related U.S. Application Data

(60) Provisional application No. 61/879,310, filed on Sep. 18, 2013.

(51) Int. Cl.
*F16J 15/34* (2006.01)
*F02C 7/28* (2006.01)
(Continued)

(52) U.S. Cl.
CPC ............ *F16J 15/3496* (2013.01); *F01D 9/02* (2013.01); *F01D 11/001* (2013.01);
(Continued)

(58) Field of Classification Search
CPC .... F16J 15/3496; F16J 15/3464; F16J 15/444; F16J 15/34; F01D 9/02; F01D 11/001;
(Continued)

(56) References Cited

U.S. PATENT DOCUMENTS 2,044,692 A * 6/1936 Huhn ................... F16J 15/4472
277/415
2,062,352 A * 12/1936 Criner ....................... B24B 3/58
451/224

(Continued)

FOREIGN PATENT DOCUMENTS

EP 2090754 A2 8/2009
JP 2005113881 A 4/2005
JP 2013019381 A 1/2013

OTHER PUBLICATIONS

Supplementary European Search Report for Application No. EP 14 84 6583.
(Continued)

*Primary Examiner* — Nathan Cumar
(74) *Attorney, Agent, or Firm* — Cantor Colburn LLP

(57) ABSTRACT

A seal assembly includes an annular carrier defining a radially inward face, and an opposed radially outward face defining a plurality of spline slots. The spline slots are configured and adapted to receive corresponding spline tabs to center the carrier in a surrounding structure. A honeycomb seal is mounted to the radially inward face of the carrier. The honeycomb seal is configured for sealing engagement with a knife-edge seal rotating relative to the honeycomb seal. The seal assembly has a relatively low coefficient of thermal expansion in comparison to the static component or the knife-edge seal. For example, a gas turbine engine can include a seal assembly as described above, wherein the carrier is mounted to a static component and a rotor mounted for rotation relative to the carrier, and wherein the rotor
(Continued)

includes the knife edge seal component sealingly engaged to the honeycomb seal.

13 Claims, 3 Drawing Sheets

(51) Int. Cl.
| | |
|---|---|
| *F01D 11/08* | (2006.01) |
| *F01D 11/12* | (2006.01) |
| *F01D 11/22* | (2006.01) |
| *F01D 11/00* | (2006.01) |
| *F16J 15/44* | (2006.01) |
| *F01D 9/02* | (2006.01) |

(52) U.S. Cl.
CPC ............ *F01D 11/003* (2013.01); *F01D 11/08* (2013.01); *F01D 11/12* (2013.01); *F01D 11/122* (2013.01); *F01D 11/125* (2013.01); *F01D 11/127* (2013.01); *F01D 11/22* (2013.01); *F02C 7/28* (2013.01); *F16J 15/3464* (2013.01); *F16J 15/444* (2013.01); *F05D 2220/32* (2013.01); *F05D 2240/55* (2013.01); *F05D 2250/283* (2013.01)

(58) Field of Classification Search
CPC ........ F01D 11/003; F01D 11/08; F01D 11/12; F01D 11/122; F01D 11/127; F01D 11/125; F01D 11/22; F02C 7/28; F05D 2220/32; F05D 2240/55; F05D 2250/283

USPC ........................................................ 277/390
See application file for complete search history.

(56) References Cited

U.S. PATENT DOCUMENTS

| | | | | |
|---|---|---|---|---|
| 4,053,254 | A | * | 10/1977 | Chaplin .................. F01D 11/08 415/116 |
| 4,456,427 | A | | 6/1984 | Evans et al. |
| 5,346,362 | A | | 9/1994 | Bonner et al. |
| 8,079,807 | B2 | * | 12/2011 | Shapiro ................. F01D 25/246 415/173.1 |
| 2004/0086381 | A1 | | 5/2004 | Brisson et al. |
| 2005/0150234 | A1 | * | 7/2005 | Urso ..................... F01D 11/001 60/796 |
| 2011/0189009 | A1 | * | 8/2011 | Shapiro .................. F01D 11/12 415/209.3 |
| 2013/0119617 | A1 | | 5/2013 | Alvanos et al. |

OTHER PUBLICATIONS

English Translation to Abstract JP2005-113881.
English Translation to Abstract JP2013-019381.
International Search Report for International Application No. PCT/US2014/048846; dated Nov. 13, 2014.
Written Opinion for International Application No. PCT/US2014/048846; dated Nov. 13, 2014.

* cited by examiner

SPLINED HONEYCOMB SEALS

RELATED APPLICATIONS

This application claims the benefit of and priority to U.S. Provisional Patent Application No. 61/879,310 filed Sep. 18, 2013, the contents of which are incorporated herein by reference in their entirety.

BACKGROUND OF THE INVENTION

1. Field of the Invention

The present disclosure relates to seals, and more particularly to seals such as used in gas turbine engines.

2. Description of Related Art

The loss of secondary flow into the gas path of a turbine has a negative effect on engine fuel burn, performance, efficiency, and component life. A seal including of a rotating knife edge seal in close proximity to a honeycomb seal is commonly used in turbo-machinery. The ability of the seal to minimize leakage by maximizing rub depth and/or minimizing the gap is limited by the relative radial thermal growth of the two components during engine operation and the minimum cold assembly gap required to enable assembly under worst-case part tolerances and other assembly considerations.

The honeycomb seal is commonly brazed directly to a turbine static component that requires high temperature and high strength capability, and such alloys typically also have a relatively high coefficient of thermal expansion (CTE) that is often comparable to the rotating knife edge seal. As a result of having similar CTE's, a desired or beneficial condition of having the knife edge seal grow closer or abut into the honeycomb seal is not achievable. In a less common configuration, a honeycomb seal is brazed to a non-structural, thin-walled, low-CTE seal carrier that is cantilevered off of the structural static component. However, to achieve tip gap reduction that is associated with large relative CTE differences, the thin-walled seal carrier must be spaced axially far from the structural static component. Such a configuration is often not desirable or even possible, e.g., in applications with design space limitations or due to other considerations such as vibration.

Such conventional methods and systems have generally been considered satisfactory for their intended purpose. However, there is a need in the art for seals that allow for improved sealing in a compact space. There also remains a need in the art for improved repairability in the field. The present disclosure provides a solution for these problems.

SUMMARY OF THE INVENTION

A seal assembly includes an annular carrier defining a radially inward face, and an opposed radially outward face defining a plurality of spline slots. The spline slots are configured and adapted to receive corresponding spline tabs to center the carrier in a surrounding structure. A honeycomb seal is mounted to the radially inward face of the carrier. The honeycomb seal is configured for sealing engagement with a rotary seal component rotating relative to the honeycomb seal.

In certain embodiments, the seal assembly includes a static component, wherein the carrier is mounted to the static component with a plurality of spline tabs and each spline tab engages a corresponding spline slot in the carrier and a corresponding spline slot in the static component. The carrier can have a coefficient of thermal expansion that is different from that of the static component. The carrier can have a coefficient of thermal expansion that is lower than that of the static component.

In accordance with certain embodiments, there are at least three spline slots defined in the carrier. A secondary seal can be seated between the static component and the carrier to provide a sealing engagement therebetween. A retainer can axially retain the carrier relative to the static component, e.g., wherein the carrier is axially captured between the secondary seal and the retainer.

The seal assembly can include a rotor mounted for rotation relative to the carrier, wherein the rotor includes a knife edge seal component sealingly engaged to the honeycomb seal. The knife edge seal component can have a coefficient of thermal expansion different from that of the honeycomb seal. For example, the knife edge seal component can have a higher coefficient of thermal expansion than that of the honeycomb seal for increasing the sealing engagement with increasing temperature of the knife edge seal component and honeycomb seal.

A gas turbine engine can include a seal assembly as described above, wherein the carrier is mounted to a static component with a plurality of spline tabs, wherein each spline tab engages a corresponding spline slot in the carrier and a corresponding spline slot in the static component. A rotor mounted for rotation relative to the carrier. The rotor includes a knife edge seal component sealingly engaged to the honeycomb seal to provide a seal against fluid communication from within the static component and rotor to a space exterior thereto.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
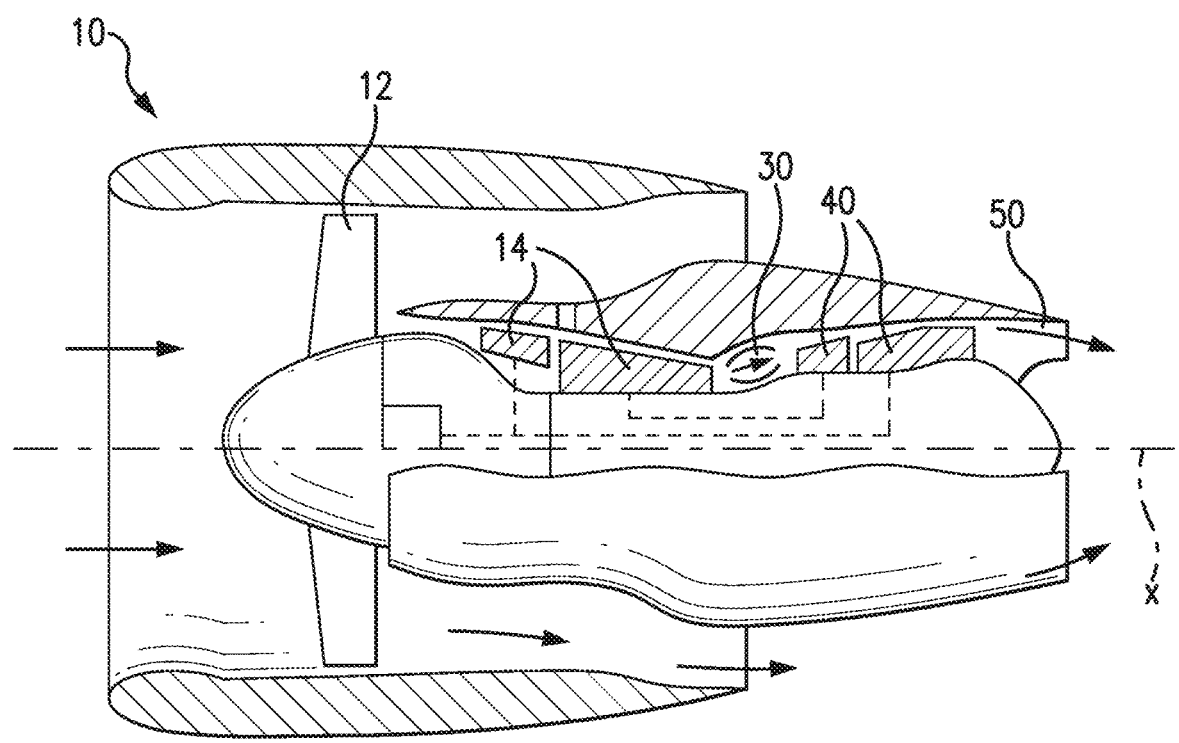
FIG. 1 is a schematic cross-sectional side elevation view of an exemplary embodiment of a gas turbine engine in accordance with the present disclosure, showing a location of the seal assembly.

Reference will now be made to the drawings wherein like reference numerals identify similar structural features or aspects of the subject disclosure. For purposes of explanation and illustration, and not limitation, a partial view of an exemplary embodiment of the seal assembly in accordance with the disclosure is shown in FIG. 2 and is designated generally by reference character 100. Other embodiments of seal assemblies in accordance with the disclosure, or aspects thereof, are provided in FIGS. 1 and 3-5, as will be described. The systems and methods described herein can be used to provide sealing in thermal expansion and contraction environments such as in sealing between chambers in gas turbine engines.

Figure 2:
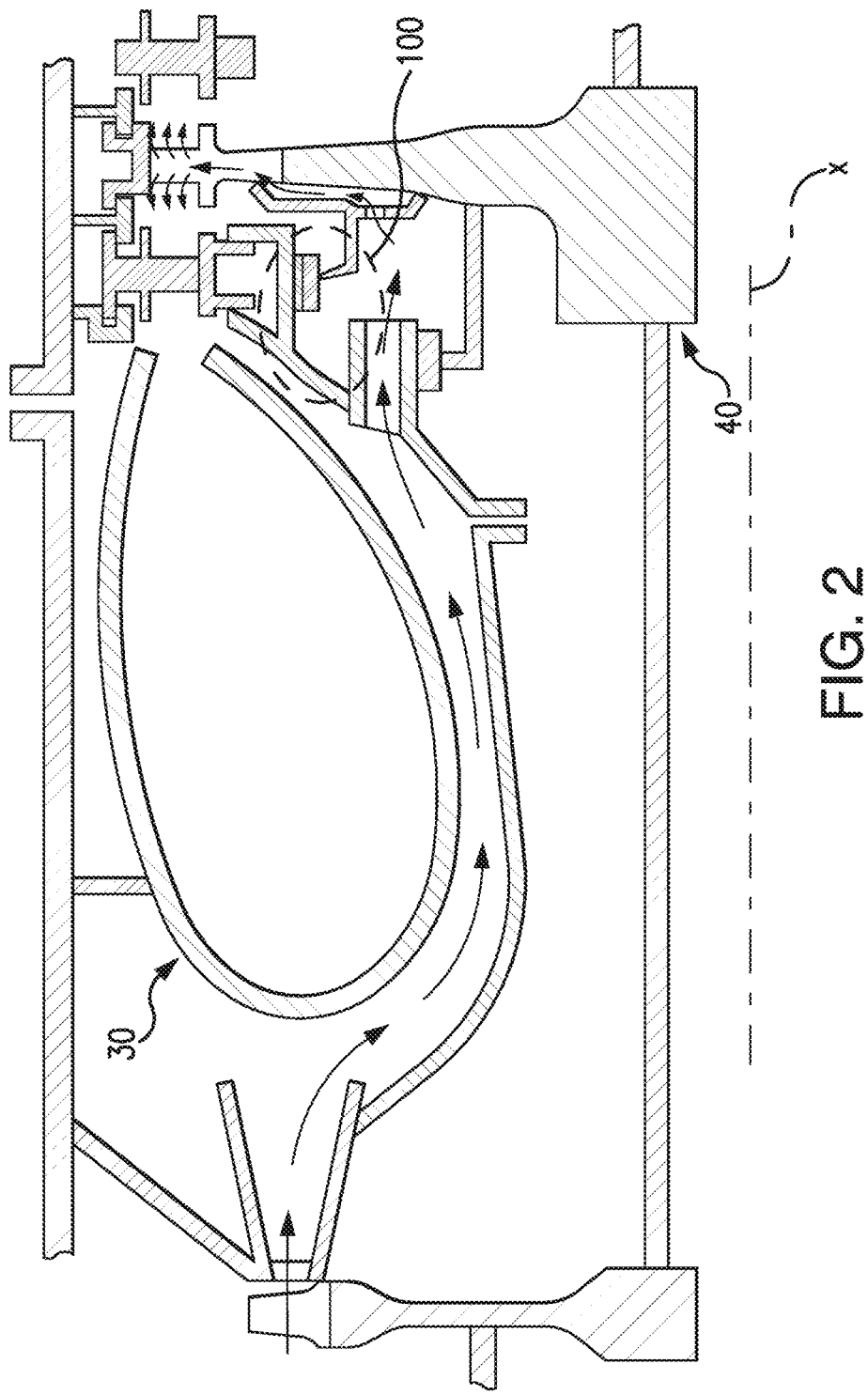
FIG. 2 is a cross-sectional elevation view of the combustor section of the gas turbine engine of FIG. 1, showing the inlet of the turbine section and the seal assembly.

FIG. 1 schematically illustrates an example of a gas turbine engine 10 including a fan section 12, a compressor section 14, a combustor section 30, and a turbine section 40. The gas turbine engine 10 is circumferentially disposed about an engine centerline X. During operation, air is pulled into the gas turbine engine 10 by the fan section 12, pressurized by the compressor section 14, mixed with fuel and burned in the combustor section 30, flowed through the turbine section 40 to extract energy from hot combustion gases, and exited through an exhaust section 50. This defines gas flow path through the gas turbine engine 10. There is secondary flow throughout the gas turbine engine 10. Seals and seal assemblies prevent the loss of secondary flow. FIG. 2 shows the combustor section 30, in fluid communication with the turbine section 40. FIG. 2 also shows a seal assembly 100 in a region of secondary flow in the turbine section 40. The seal assembly can also be located in further aft stages of the turbine section 40, between the combustor section 30 and the turbine section 40, or in other location in the gas turbine engine 10 so as to manage airflow between secondary flow cavities or chambers, e.g. to reduce parasitic leakage into the flowpath and control flow levels and pressures between chambers.

Figure 3:
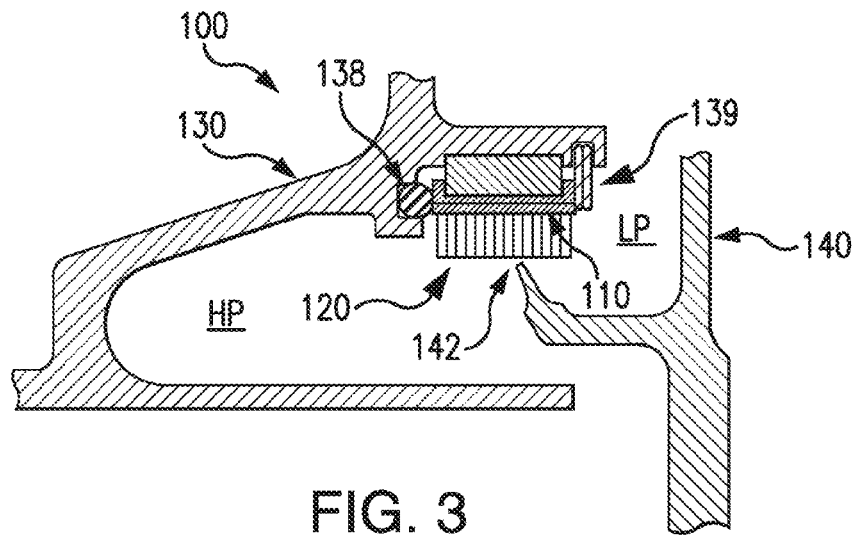
FIG. 3 is a cross-sectional elevation view of the seal assembly, static component, and rotor in accordance with the present disclosure.

Referring to FIG. 3, the seal assembly 100 includes a carrier 110 and a honeycomb seal 120. The carrier 110 is made from an alloy with a relatively low coefficient of thermal expansion (CTE) and is mounted (e.g., brazed) to the honeycomb seal 120. The carrier 110 is mounted to a static component 130 of the turbine section 40, e.g. a tangential on-board injector (TOBI), The static component 130 is made from an alloy material that possesses high-temperature and/or high-strength capability, and also has a relatively high CTE. Such materials are known in the art, such as wrought precipitation hardenable nickel base alloys. Several benefits can be provided by this arrangement since the honeycomb seal 120 is not brazed directly to the static component 130: a) the static component 130 is not subjected to heat treat cycles typically accompanied with brazing which can debit material properties and cause distortion during original manufacturing as well as during aftermarket repair; b) inspection of the honeycomb braze may be easier; c) reparability of the static component 130 and replacement of the honeycomb seal 120 may be improved; and d) the static component 130 does not carry the additional weight normally required for structures that accommodate reparability of traditional honeycomb seals.

Spline features are provided in the seal assembly 100 to keep the carrier 110 and honeycomb seal 120 centered relative to the static component 130 while enabling the honeycomb seal 120 to grow independently in the radial direction. In particular, spline tabs 112 are included, wherein each spline tab 112 engages a corresponding spline slot 102 in the carrier 110 and a corresponding spline slot 132 in the static component 130. The seal assembly 100 can achieve reduced leakage flow relative to a typical honeycomb seal within a comparable design space because the spline features allow for a seal assembly with varying coefficients of thermal expansion. Thus, the carrier 110 can have a coefficient of thermal expansion that is different from, e.g., lower than, that of the static component 130. Alternatively, the seal assembly 100 is operable in a reduced design space relative to traditional static and rotating seal configurations with comparable leakage flow.

Figure 4:
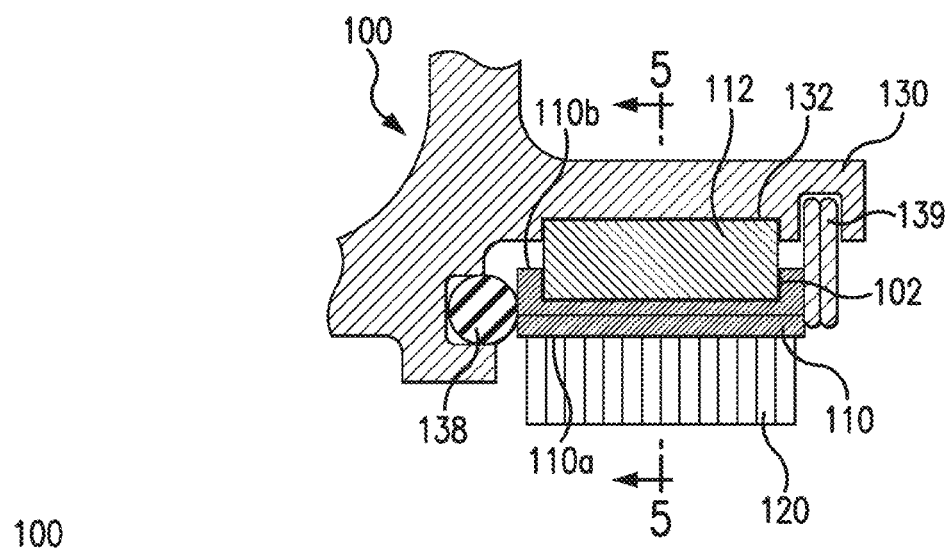
FIG. 4 is a cross-sectional side view of a portion of the seal assembly of FIG. 3 showing the carrier axially captured between a secondary seal and a retainer.
Figure 5:
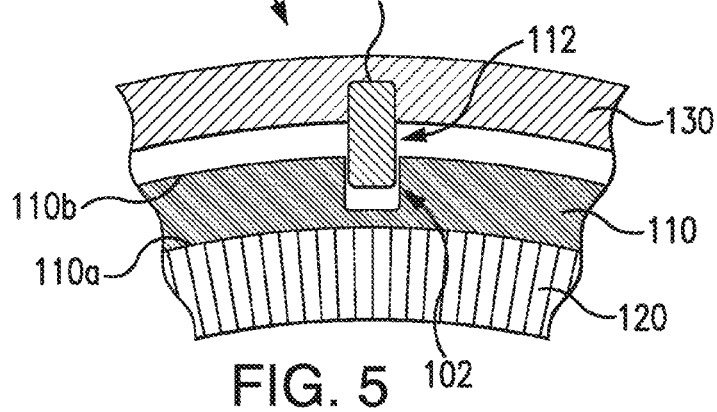
FIG. 5 is a cross-sectional end elevation view, taken at Section 5 of FIG. 4, showing the alignment of the spline slots and tabs.

Referring to FIGS. 4 and 5, the carrier 110 has a radially inward face 110a and an opposed radially outward face 110b defining a plurality of spline slots 102. The spline slots 102 receive corresponding spline tabs 112 to center the carrier 110 in the surrounding structure, e.g., the static component 130. The honeycomb seal 120 is mounted to the radially inward face 110a for sealing engagement with a rotary seal component, e.g. knife seal component 142, rotating relative to the honeycomb seal 120. The carrier 110 is mounted to the static component 130 with a plurality of spline tabs 112, and each spline tab 112 engages a carrier spline slot 102 and a static component spline slot 112. At least three spline slots 102 are defined circumferentially around the carrier 110, e.g. spaced equidistantly around the circumference of the carrier 110. Those skilled in the art will readily appreciate that any other suitable number and spacing of splines can be used without departing from the scope of the disclosure.

Referring again to FIG. 3, the turbine section 40 includes a rotor 140 mounted for rotation relative to the carrier 110, e.g. a turbine rotor section. The rotor 140 includes a knife edge seal component 142 sealingly engaged to the honeycomb seal 120 to provide a seal against fluid communication from within the turbine 40 sections to a space exterior thereto. As indicated in FIG. 3, this seals a high pressure volume (HP) from a low pressure volume (LP). The honeycomb seal 120 is radially splined to the static component 130 and in close radial proximity to the knife edge seal 142 on the rotor 140.

The knife edge seal component 142 can have a coefficient of thermal expansion different from that of the honeycomb seal 120. For example, the knife edge seal component 142 can have a higher coefficient of thermal expansion than that of the honeycomb seal 120 for increasing the sealing engagement with increasing temperature of the knife edge seal component 142 and honeycomb seal 120. The relative difference in the coefficients of thermal expansion of the knife edge seal component 142 and the honeycomb seal 120 results in a reduction in leakage flow during operation of the gas turbine engine 10.

Referring now to FIG. 4, the carrier 110 is axially captured between a secondary seal 138 and a retainer 139. At one axial end of the seal assembly 100, the secondary seal 138 is seated between the static component 130 and the carrier 110 to provide a sealing engagement therebetween. The secondary seal 138 is used to minimize the flow of leakage air escaping outboard of the honeycomb seal 120, and can be various types of seals, such as a rope seal (as shown in FIGS. 3-5), a C-seal, a W-seal, or any other suitable type of seal. At the other axial end of the seal assembly 100, the retainer 139 axially retains the carrier 110 relative to the static component 130. The retainer 139 can be formed by a variety of mechanisms, such as a snap ring.

The methods and systems of the present disclosure, as described above and shown in the drawings, provide for seals with superior properties including superior sealing in thermal expansion and contraction environments. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A seal assembly comprising:
an annular carrier having a radially inward face, and an opposed radially outward face each defining opposite ends of a plurality of spline slots, each of the plurality of spline slots being configured and adapted to receive one of a corresponding plurality of spline tabs to center the carrier in a static component;
a honeycomb seal mounted to the radially inward face of the carrier, the honeycomb seal being configured for sealing engagement with a rotary seal component rotating relative to the honeycomb seal;
wherein the annular carrier is mounted to the static component with the plurality of spline tabs, wherein each one of the plurality of spline tabs engages one of the plurality of spline slots in the annular carrier and a corresponding one of a plurality of spline slots in the static component;
a secondary seal seated between the static component and the annular carrier to provide a sealing engagement therebetween; and
a retainer separate from the annular carrier, the retainer axially retaining the annular carrier relative to the static component, wherein the annular carrier is axially captured between the secondary seal and the retainer.

2. A seal assembly as recited in claim 1, wherein the annular carrier has a coefficient of thermal expansion that is different from that of the static component.

3. A seal assembly as recited in claim 1, wherein the annular carrier has a coefficient of thermal expansion that is lower than that of the static component.

4. A seal assembly as recited in claim 1, wherein there are at least three spline slots defined in the annular carrier.

5. A seal assembly as recited in claim 1, further comprising a rotor mounted for rotation relative to the annular carrier, wherein the rotor includes a knife edge seal component sealingly engaged to the honeycomb seal.

6. A seal assembly as recited in claim 5, wherein the knife edge seal component has a coefficient of thermal expansion different from that of the honeycomb seal.

7. A seal assembly as recited in claim 5, wherein the knife edge seal component has a higher coefficient of thermal expansion than that of the honeycomb seal for increasing the sealing engagement with increasing temperature of the knife edge seal component and honeycomb seal.

8. A gas turbine engine comprising: a seal assembly as recited in claim 1, wherein a rotor is mounted for rotation relative to the annular carrier, wherein the rotor includes a knife edge seal component sealingly engaged to the honeycomb seal to provide a seal against fluid communication from within the static component and rotor to a space exterior thereto.

9. A gas turbine engine as recited in claim 8, wherein the annular carrier has a coefficient of thermal expansion that is different from that of the static component.

10. A gas turbine engine as recited in claim 8, wherein the annular carrier has a coefficient of thermal expansion that is lower than that of the static component.

11. A gas turbine engine as recited in claim 8, wherein there are at least three spline slots defined in the annular carrier.

12. A gas turbine engine as recited in claim 8, wherein the knife edge seal component has a coefficient of thermal expansion different from that of the honeycomb seal.

13. A gas turbine engine as recited in claim 8, wherein the knife edge seal component has a higher coefficient of thermal expansion than that of the honeycomb seal for increasing the sealing engagement with increasing temperature of the knife edge seal component and honeycomb seal.

* * * * *